(12) United States Patent
Naka et al.

(10) Patent No.: US 6,609,289 B2
(45) Date of Patent: Aug. 26, 2003

(54) STATOR OF ROTARY ELECTRIC MACHINE AND METHOD FOR MAKING THE SAME

(75) Inventors: Yoshio Naka, Toyota (JP); Kazuki Maesoba, Anjo (JP); Kazutaka Maeda, Toyota (JP); Masaru Sugiyama, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/098,373

(22) Filed: Mar. 18, 2002

(65) Prior Publication Data

US 2002/0089250 A1 Jul. 11, 2002

Related U.S. Application Data

(62) Division of application No. 09/549,027, filed on Apr. 13, 2000, now Pat. No. 6,400,056.

(30) Foreign Application Priority Data

Apr. 14, 1999 (JP) ............................................. 11-106914

(51) Int. Cl.⁷ ...................... H02K 15/00; H02K 15/02; H02K 3/34; H05K 3/30; H01R 43/00
(52) U.S. Cl. .............................. 29/596; 29/598; 29/837; 29/868; 310/215; 310/216
(58) Field of Search ..................... 29/596, 598, 837, 29/868, 506, 734, 512, 235, 507, 736, 513, 732, 606; 310/215, 216, 214, 201, 254, 258, 179, 180

(56) References Cited

U.S. PATENT DOCUMENTS

| | | | |
|---|---|---|---|
| 1,822,261 A | 9/1931 | Apple | 310/201 |
| 1,826,295 A | 10/1931 | Apple | 310/201 |
| 1,843,591 A | 2/1932 | Apple | 310/201 |
| 2,173,726 A | 2/1939 | Prindle | 310/215 |
| 2,473,332 A * | 6/1949 | England | 174/83 |
| 2,778,964 A | 1/1957 | Balke | |
| 3,315,105 A | 4/1967 | Moore, Jr. | 310/211 |
| 3,735,169 A | 5/1973 | Balke et al. | 310/214 |
| 3,745,394 A | 7/1973 | Mason | 310/215 |
| 4,026,009 A * | 5/1977 | Kindig et al. | 29/235 |
| 4,247,978 A | 2/1981 | Smith | 29/596 |
| 4,788,761 A | 12/1988 | Crawford et al. | 29/596 |
| 4,808,872 A * | 2/1989 | Lund et al. | 310/215 |
| 4,922,163 A | 5/1990 | McKee et al. | 310/239 |
| 5,068,563 A * | 11/1991 | Cummings | 310/194 |
| 5,763,978 A * | 6/1998 | Uchida et al. | 310/215 |
| 5,952,761 A | 9/1999 | Itoh et al. | 310/215 |
| 6,147,430 A * | 11/2000 | Kusase et al. | 310/215 |

FOREIGN PATENT DOCUMENTS

| | | | | |
|---|---|---|---|---|
| JP | 58-54856 | | 3/1983 | |
| JP | 58 039233 A | | 3/1983 | |
| JP | 58-157349 | * | 9/1983 | ............ H02K/3/34 |
| JP | 4-17539 | | 1/1992 | |
| JP | 07 075273 A | | 3/1995 | |
| JP | 8-70544 | | 3/1996 | |
| JP | 8-237897 | | 9/1996 | |
| JP | 10-257705 | | 9/1998 | |

OTHER PUBLICATIONS

"Stator for Alternator", Journal of Nippondenso Technical Disclosure, 43–127, Sep. 15, 1985, p. 127.

(List continued on next page.)

Primary Examiner—Carl J. Arbes
Assistant Examiner—Thiem Phan
(74) Attorney, Agent, or Firm—Oliff & Berridge, PLC

(57) ABSTRACT

A stator core has a plurality of slots. Insulating members are formed into a cylindrical shape and are inserted into the slots. Axial ends of the insulating members are expanded respectively and deformation marks thinner than the other portion are formed respectively. Then, the insulating members are moved toward the expanded ends to position the deformation marks in the out of the slots. After that, the conductors are inserted into the slots from the expanded side of the insulating members. Therefore, insulation failure at the portions of the deformation marks is prevented.

18 Claims, 9 Drawing Sheets

OTHER PUBLICATIONS

"Insulating Method for Direct Current Motor", Journal of Nippondenso Technical Disclosure, 80–060, Sep. 15, 1991, p. 60.

"Stator for Alternator", Journal of Nippondenso Technical Disclosure, 52–293, Mar. 15, 1987, p. 293.

"Insulating Member for Slot of Rotary Electric Machine", Journal of Nippondenso Technical Disclosure, 09–040, Jan. 20, 1978, p. 40.

"Alternator", Journal of Nippondenso Technical Disclosure, 83–077, Mar. 15, 1992, p. 77.

* cited by examiner

STATOR OF ROTARY ELECTRIC MACHINE AND METHOD FOR MAKING THE SAME

CROSS-REFERENCE TO RELATED APPLICATION

This is a Division of application Ser. No. 09/549,027 filed Apr. 13, 2000 now U.S. Pat. No. 6,400,056. The entire disclosure of the prior application(s) is hereby incorporated by reference herein in its entirety.

This application is based on Japanese Patent Application No. Hei 11-106914 filed on Apr. 14, 1999, the contents of which is incorporated herein by reference.

BACKGROUND OF THE INVENTION

1. Field of the Invention

The present invention relates to a stator of a rotary electric machine having an improved dielectric strength at an edge of an axial inlet of a slot and a manufacturing method of the same.

2. Description of Related Art

It is known that a construction is disclosed in JP 58-157349A for improving a dielectric strength at an edge of a slot formed on a stator of rotary electric machine. In this prior art, wavy creases are previously formed on a portion of an insulating member where the insulating member contacts an edge of a slot. After that, an end portion of the insulating member extended from the slot is heated and expanded. As a result, easiness for inserting a conductor into the slot is improved, and insulation is maintained by inserting the insulating member to separate the conductor and the edge.

However, in the prior art, a heating and forming die is pressed on the stator core when the end portion is heated and expanded. The insulator is pressed on the edge of the slot, and a thickness is decreased. Therefore, there is a possibility of insulation failure if the conductor is compressed between the die and the edge of the slot and is deformed.

SUMMARY OF THE INVENTION

The present invention addresses these drawbacks by providing an improved stator arrangement.

It is therefore an object of this invention to provide a stator having improved dielectric strength at the edge of the slot and a manufacturing method.

According to the present invention, an expanded end is formed on an insulating member. The insulating member is moved toward a side of the expanded end before a conductor is inserted from the expanded end.

Therefore, an easiness to insert the conductor is improved due to the expanded end. An additional damage on the deformation mark is prevented when the conductor is inserted. Therefore, an insulation failure at a deformation mark is prevented.

It is preferred that the deformation mark is positioned in the out of the slot after a conductor is inserted. In this construction of the stator, an additional damage on the deformation mark is prevented during the conductor is inserted. A thickness of the insulating member positioned between an edge of a slot and the conductor is maintained thicker than the thinned deformation mark.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

Figure 1:
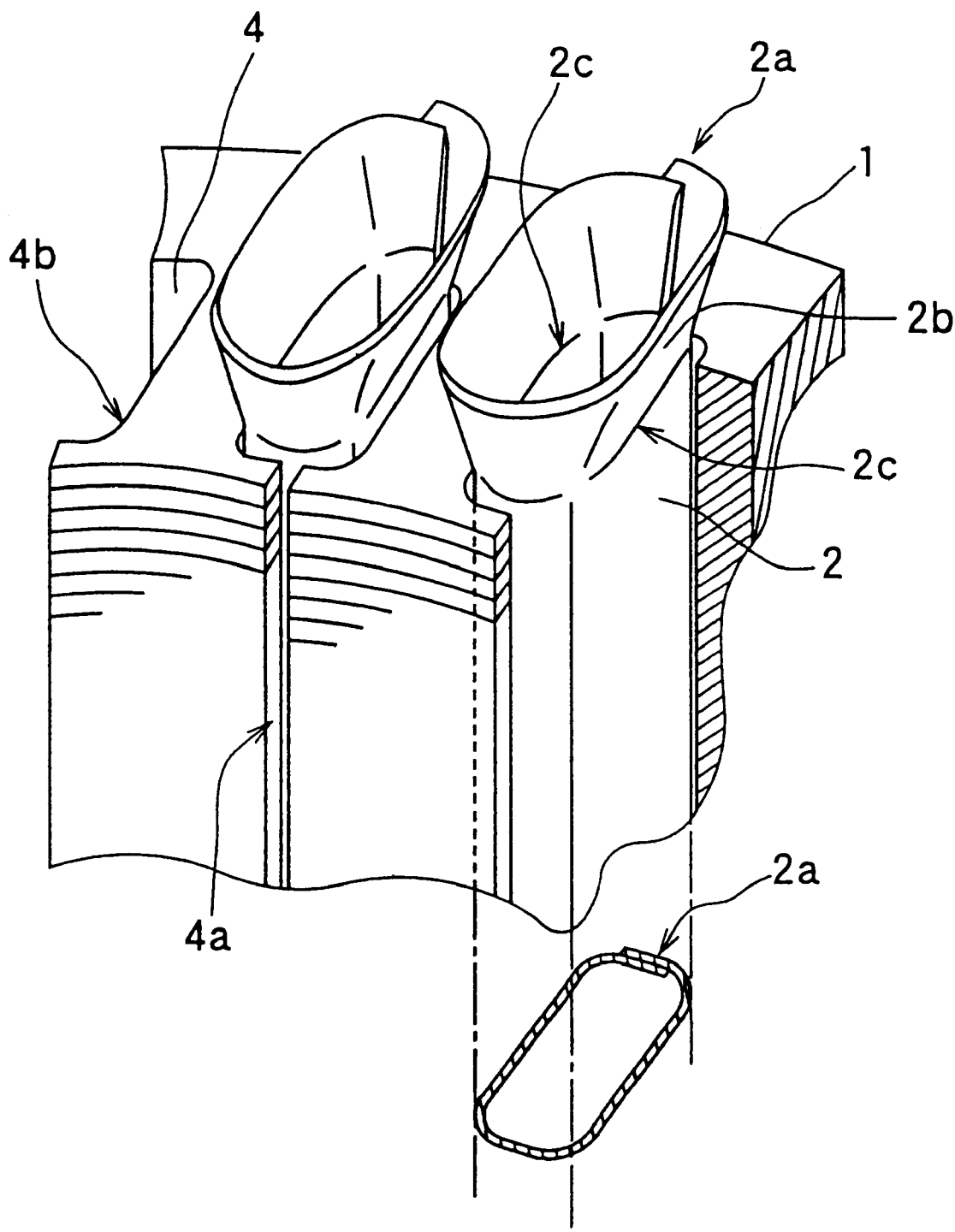
FIG. 1 is a perspective view showing a stator core and an insulating member of an embodiment of the present invention.

An embodiment of the invention will be described with reference to the drawings.

A stator has a cylindrical stator core 1, a plurality of insulating members 2 and a plurality of conductors 3. Each insulating member 2 is made of a sheet material. Each conductor 3 is shaped as a U-shape. The stator core 1 is formed by laminating thin silicon steel sheets. A plurality of slots 4 are formed on the stator core 1 at even intervals. Each slot 4 has an opening 4a at an inside of the stator core 1 and openings at both of axial sides. The stator core 1 is formed to accommodate a three-phase stator coil. The insulating member 2 may be made of, for instance, an insulating paper or a nonwoven fabric sheet.

Figure 2:
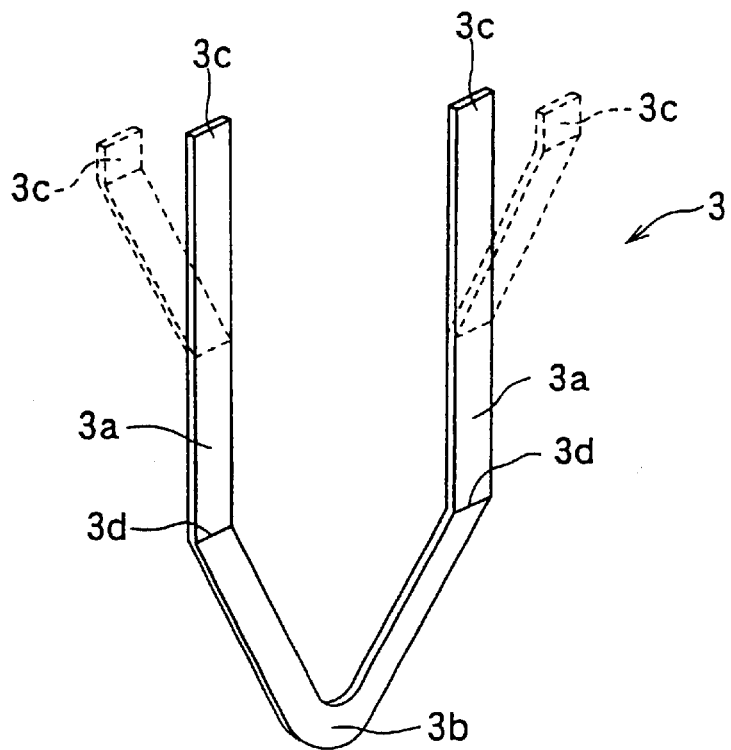
FIG. 2 is a perspective view showing a shape of a conductor inserted in to the stator core.

As shown in FIG. 2, the U-shaped conductor 3 is a copper wire having a rectangular cross section corresponding to the slot 4. The conductor 3 has accommodated portions 3a to be accommodated into the slots 4, a turn portion 3b connecting the accommodated portions 3a and connecting ends 3c to be connected to the other conductor. The two accommodated portions 3a are respectively inserted into the slots 4 spaced apart a predetermined pitch. After that, the two connecting ends 3c of the U-shaped conductor 3 are respectively twisted in a predetermined direction for a predetermined pitch. After that, one of the connecting ends 3c is connected to another one of the connecting ends 3c. Then, the stator coil is produced. In this construction, one of the accommodated portions 3a and the turn portion 3b are connected via a bent portion 3d.

Next, the inserting process and the expanding process of the insulating member 2 will be described with reference to FIGS. 3 through 7.

Figure 3:
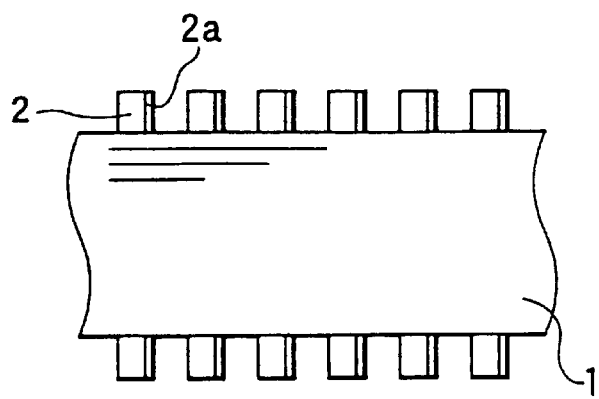
FIG. 3 is a side view showing an expanding process of the insulating member.

At first, longitudinal side edges of the sheet-shaped insulating member 2 are overlapped with each other by rounding the sheet-shaped insulating member 2 into cylindrical shape. Then, an overlapping portion 2a is formed. The cylindrical insulating member 2 is inserted into the slot 4 from one axial end of the slot 4 so that the overlapping portion 2a is positioned to oppose an inner surface of the slot 4. In this embodiment, the overlapping portion 2a is positioned in a radial outside. Each of the insulating members 2 provides an inner cavity for receiving and accommodating a conductor. Therefore, as shown in FIG. 3, the cylindrical-shaped insulating members 2 are disposed in the slots 4 to form a line.

Next, a former 5 heated to a predetermined temperature is pressed on ends of the insulating members 2 protruding from the slots 4. The former 5 has a plurality of former dies 5a integrally connected in a raw. Each of the former dies 5a has a conical shape. In this embodiment, each of the former dies 5a is shaped as a quadrangular pyramid. A tip 5b of the die 5a has a shape corresponding to a shape of the slot 4 to be able to be inserted into the slot. The former dies 5a are located so that the former dies 5a are inserted into alternate slots 4 simultaneously. The former dies 5a may be arranged to insert every third slots or the like.

Figure 4:
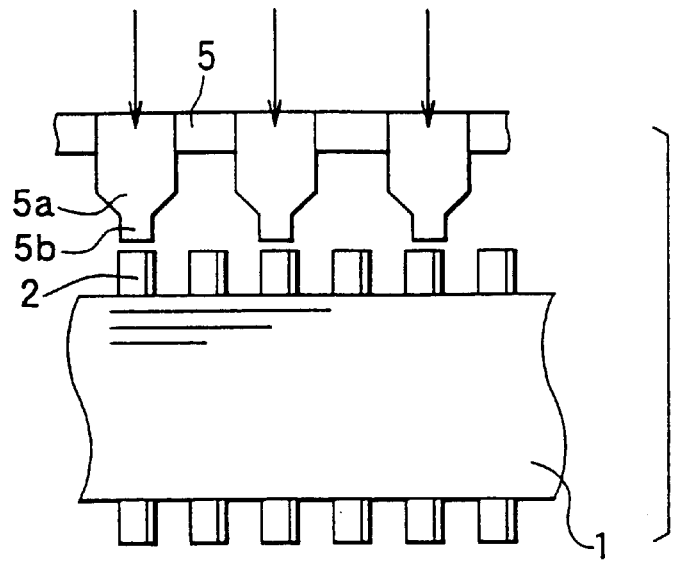
FIG. 4 is a side view showing an expanding process of the insulating member.
Figure 5:
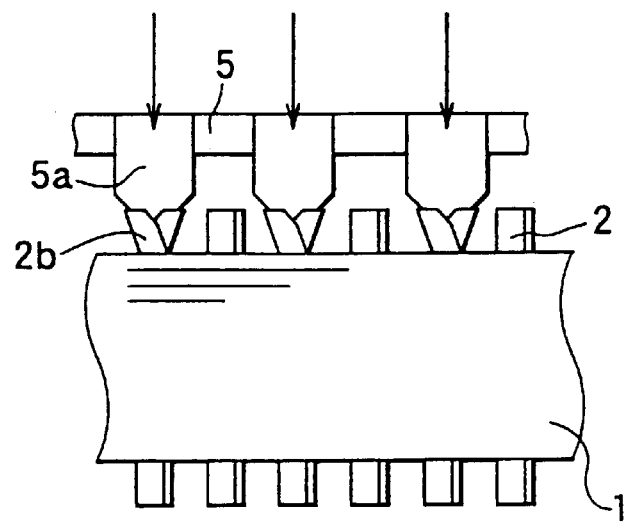
FIG. 5 is a side view showing an expanding process of the insulating member.

As shown in FIG. 4, the former 5 in which the former dies 5a are heated to the predetermined temperature is moved by a driving device which is not shown so that the former dies 5a are contacted with the ends of the insulating members 2. As shown in FIG. 5, each of the insulating members 2 protruding from the slots 4 is compressed between the former die 5a and an edge formed along an axial opening of the slot 4. Each of the ends of the insulating members 2 is expanded as a funnel shape. Therefore, expanded ends 2b are formed.

Figure 6:
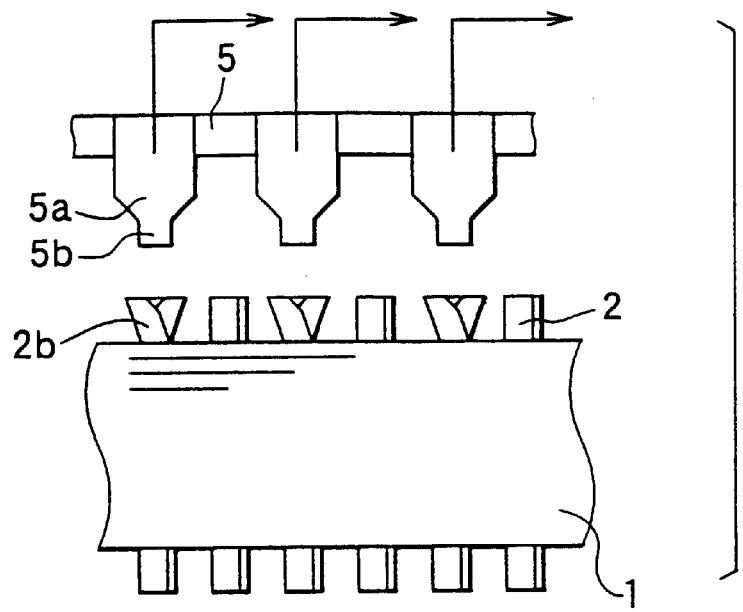
FIG. 6 is a side view showing an expanding process of the insulating member.
Figure 7:
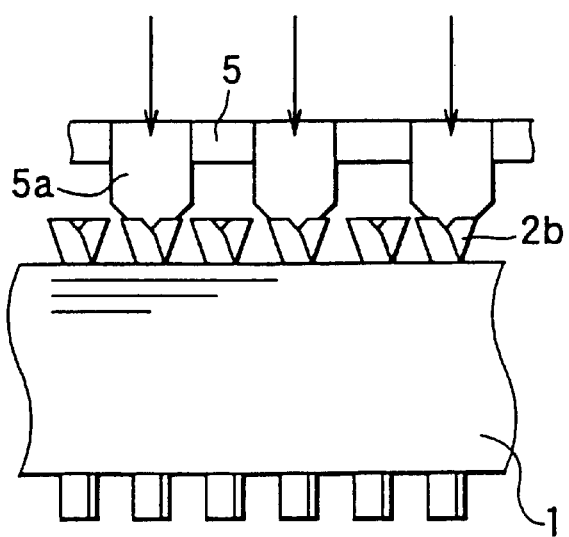
FIG. 7 is a side view showing an expanding process of the insulating member.

In the above-described process, the insulating member 2 is pressed on the edge 4b formed between the axial end surface of the stator core 1 and the inner surface of the slot 4. Therefore, a deformation mark 2c, being thinner than the other portion, is formed on a portion where the insulating member 2 is compressed between the former die 5a and the edge 4b. The driving device moves the former 5 upwardly after the ends of the insulating members 2 are expanded as shown in FIG. 6. The former 5 is moved for a slot in the circumferential direction of the stator core so that the former 5 is positioned above the insulating members 2 in which the ends are still not processed. After that, the former 5 is moved downwardly again, and is pressed on the insulating members 2 to process them as shown in FIG. 7. Therefore, the ends of the insulating members 2 are processed at an above-described expanding process. As a result, the stator core 1 equipped with the insulating members 2 having the expanded ends is obtained as shown in FIG. 1.

Next, a pushing-up process of the insulating member 2 and an inserting process of the conductors into the slots 4 will be described with reference to FIGS. 8 through 12.

Figure 8:
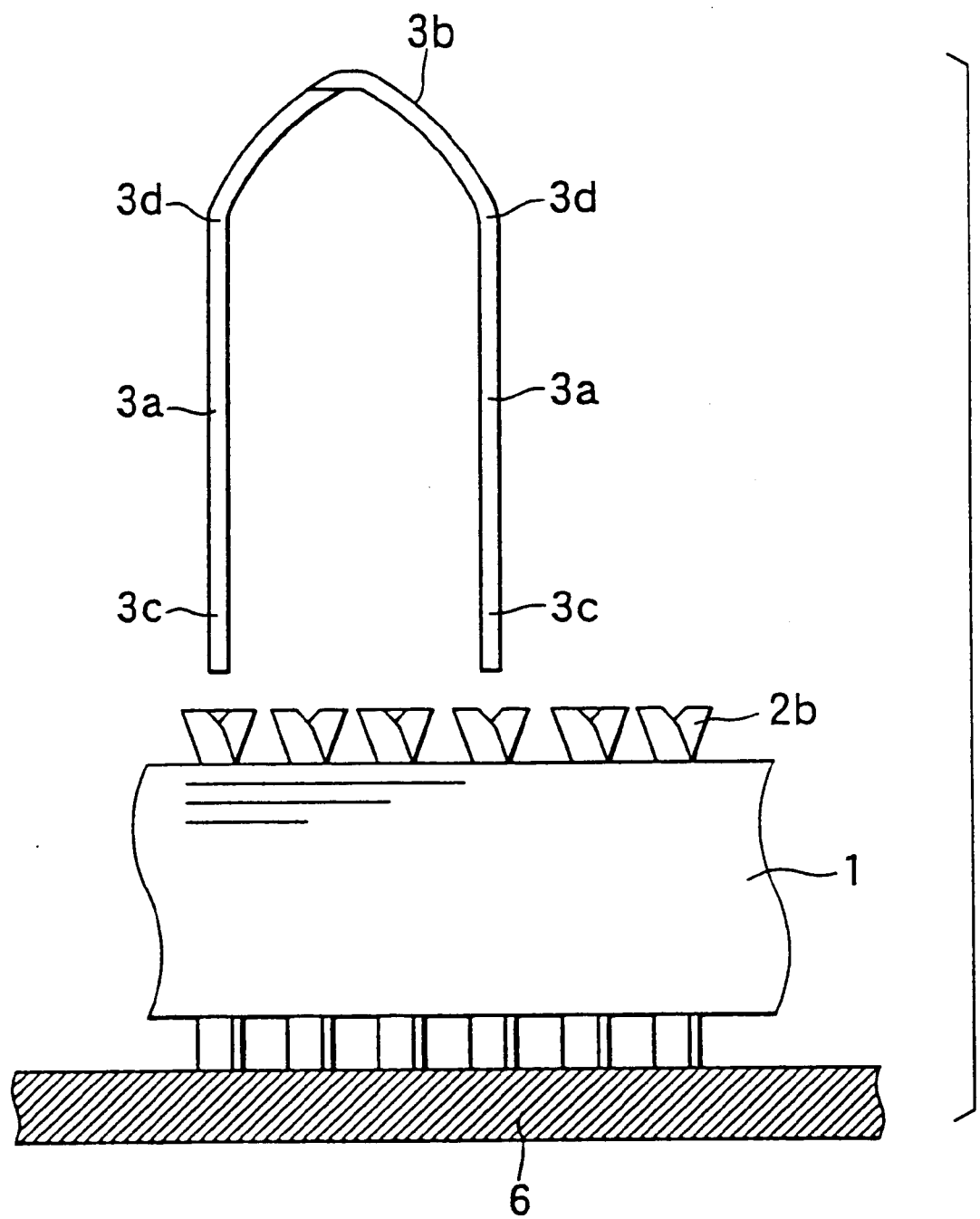
FIG. 8 is a side view showing a pushing up process of the conductor.
Figure 9:
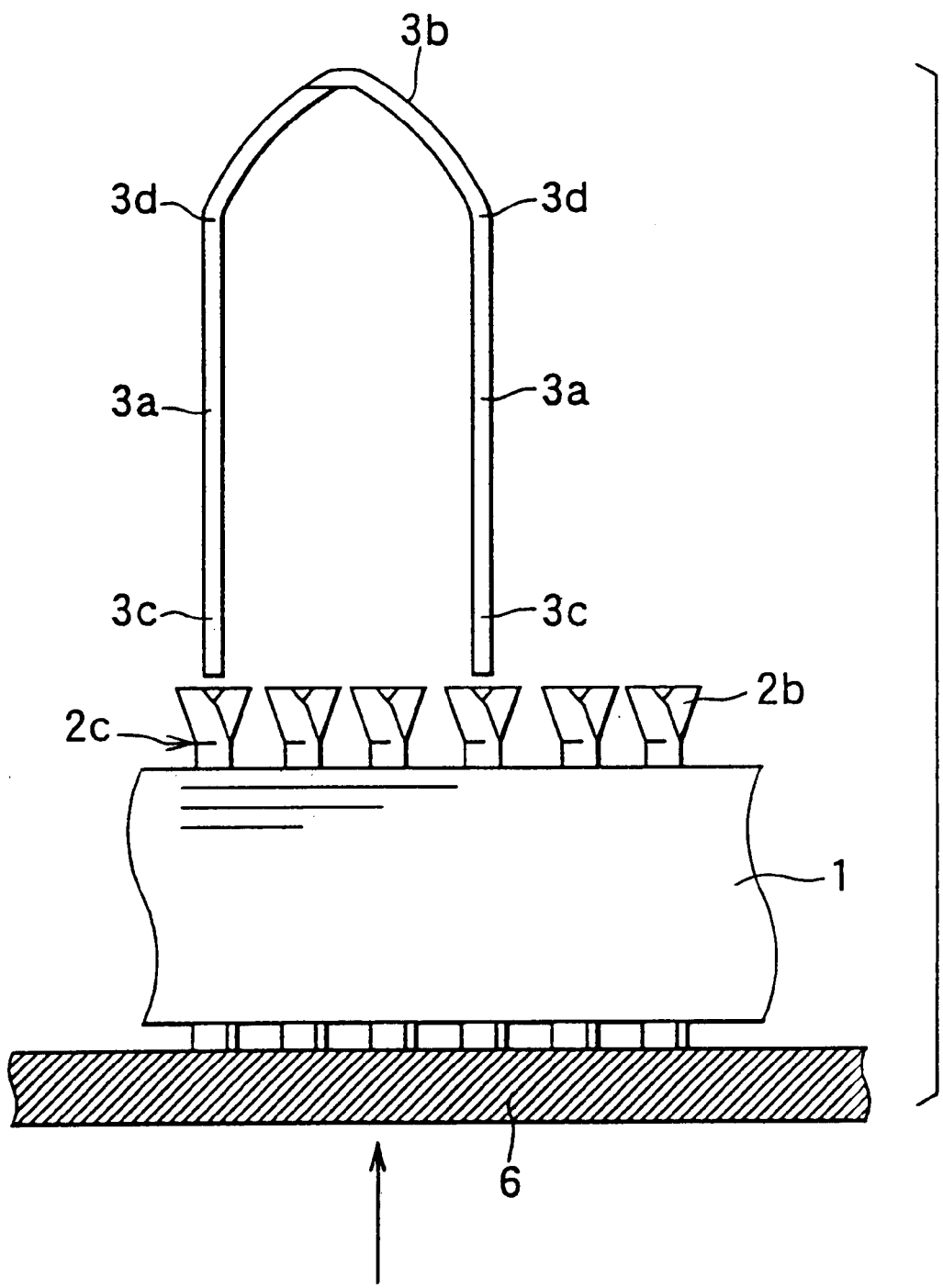
FIG. 9 is a side view showing a pushing up process of the conductor.

At first, the insulating members 2 are moved for a predetermined distance by being pushed from the other ends of the insulating members 2, that is, from the ends which are not processed by the heating and forming process as shown in FIGS. 8 and 9. The pushing-up process of the insulating members 2 is carried out by using a support plate 6 and a driving motor which is not shown. The process includes a step for bringing the support plate 6 to contact with the other ends of the insulating members 2, and a step for pushing the support plate 6 by the driving motor to push all of the insulating members up simultaneously.

Figure 10:
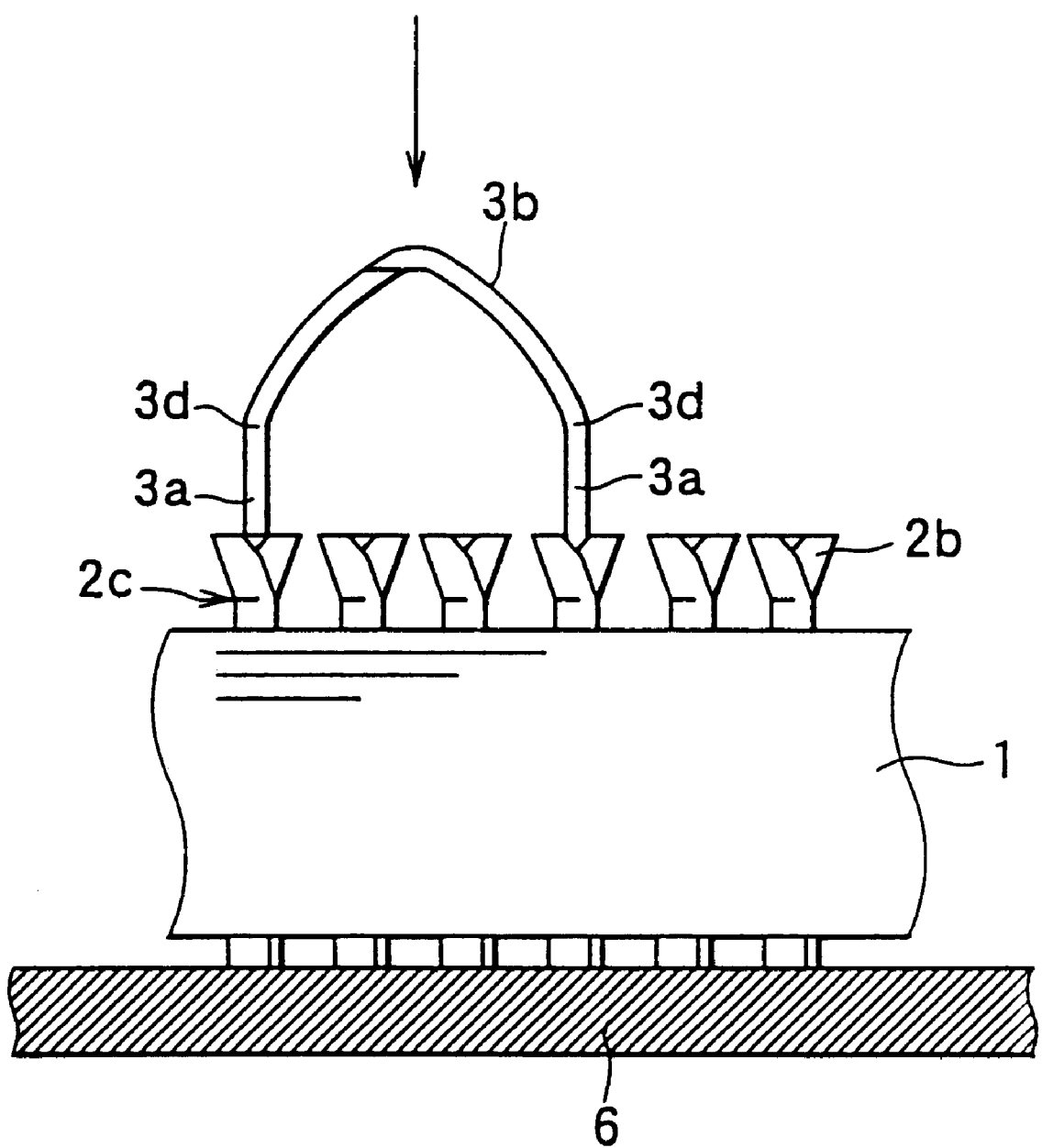
FIG. 10 is a side view showing an inserting process of the conductor.
Figure 11:
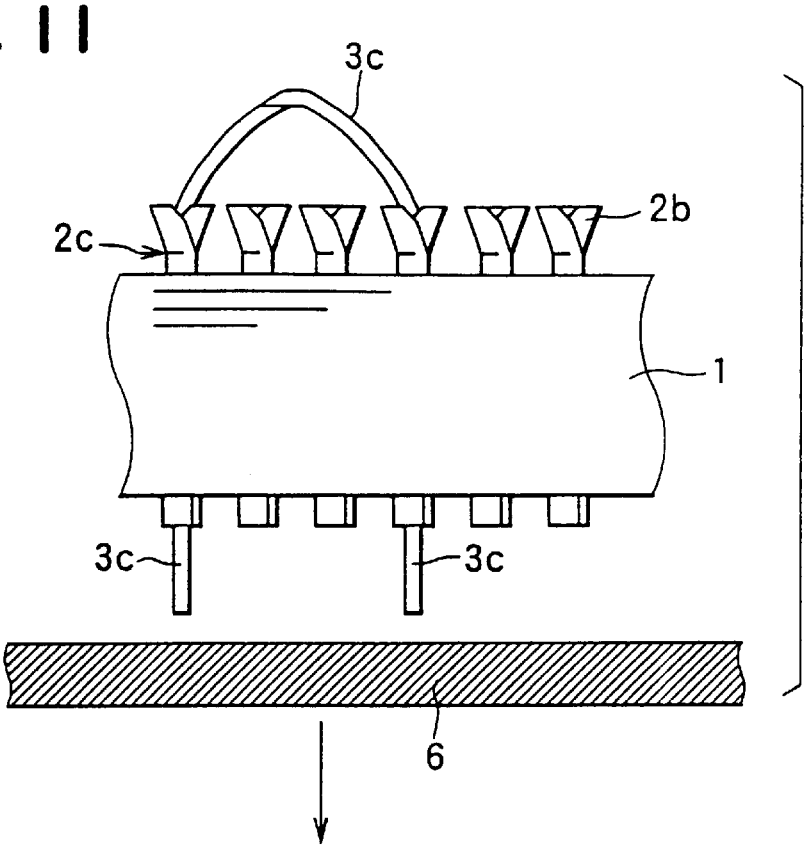
FIG. 11 is a side view showing an inserting process of the conductor.

A plurality of U-shaped conductors 3 are inserted into bores defined by the insulating members 2 in the slots 4. The conductors 3 are inserted from the expanded ends of the insulating members 2 after the pushing-up process of the insulating member 2 is completed as shown in FIG. 10. At this time, the two accommodated portions 3a of the U-shaped conductor 3 are accommodated into the slots 4 spaced apart a predetermined magnetic pole pitch respectively. The support plate 6 supports the other ends of the insulating members 2 even when the conductors 3 are inserted into the slots 4. The process of inserting the conductors 3 into the slots 4 is progressed until the ends of the conductors 3 contact with the support plate 6.

After the ends of the conductors 3 contact with the support plate 6, the conductors 3 are moreover inserted with releasing a support by the support plate 6. In this embodiment, the support is released by moving the support plate 6 back synchronously with an insertion of the conductor. The conductors 3 are inserted until the bent portions 3d of the conductors 3 are rested on the edges 4b of the slots 4.

Figure 12:
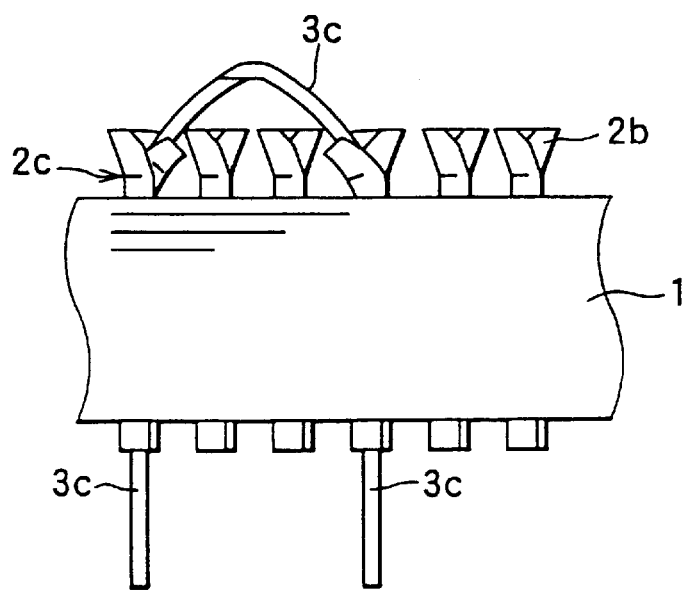
FIG. 12 is a side view showing a form after the insertion of the conductor is completed.

An appearance shown in FIG. 12 is obtained after the inserting process of the conductors 3 is completed. The deformation marks 2c are placed on an out of the slots 4 when the insertion of the conductor 3 is completed.

The connecting ends 3c of one conductor 3 are bent in an opposite circumferential directions to respectively make an electric conduction with the other conductor 3 spaced apart the predetermined magnetic pole pitch. The two connecting ends 3c of different conductors 3 are joined. As a result, the conductors 3 construct the stator coil.

Figure 13:
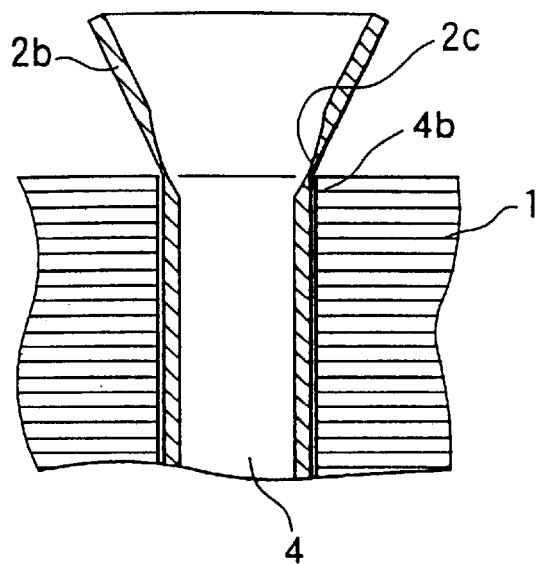
FIG. 13 is a sectional view in the circumferential direction of the stator core showing the insulating member and the stator core.
Figure 14:
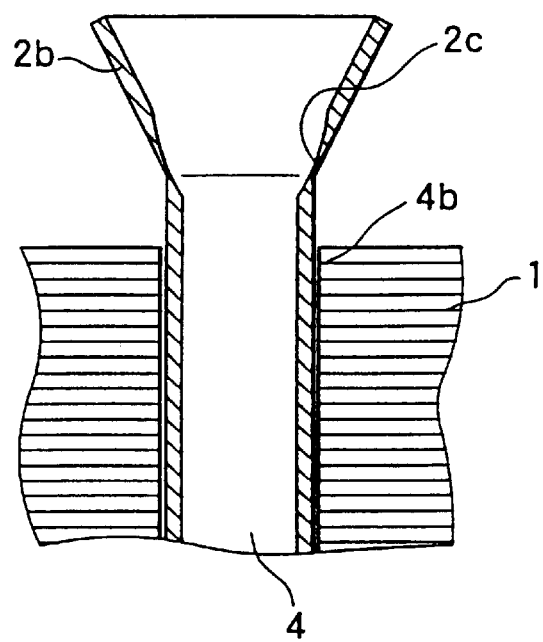
FIG. 14 is a sectional view in the circumferential direction of the stator core showing the insulating member and the stator core.

As shown in FIG. 13, the portion of the insulating member 2 opposing to the edge 4b of the slot 4 is thinned as the deformation mark 2c, because it is compressed between the edge 4b and the former 5. This thinned deformation mark 2c is moved to the out of the slot 4 at the pushing-up process of the insulating member 2. In the inserting process of the conductor 3, the conductor 3 is inserted until the bent portion 3d contacts with the edge 4b of the slot 4. Therefore, the insulating member 2 is pressed on the edge 4b of the slot 4 by the bent portion 3d of the conductor 3.

However, the deformation mark 2c has been pushed out to the out of the slot 4. Therefore, a portion pressed on the edge 4b by the conductor 3 is different from the portion of the thinned deformation mark 2c. As a result, an insulation failure between the conductor 3 and the stator core 1 at the portion of the deformation mark 2c is prevented.

In this embodiment, the support plate 6 supports the insulating members 2 at the ends not expanded. Therefore, it is prevented that the deformation mark 2c is pushed back to the edge 4b of the slot 4 again. This is effective to maintain the insulation.

In this embodiment, the forming dies 5a each shaped into the quadrangular pyramid expand the ends of the insulating members 2. Accordingly, the ends of the insulating members 2 can be easily expanded only by pressing the heated former die 5a. Further, it is possible to improve easiness to insert the conductors 3 into the slots 4 by expanding the ends of the insulating members 2.

In this embodiment, the former 5 has the plurality of former dies 5a which are integrally connected in a line. The former 5 is constructed to be able to provide the heating and forming process to the plurality of insulating members 2 simultaneously. Therefore, it is possible to shorten a man-hour for the manufacturing process.

In this embodiment, the former 5 can be inserted into the slots 4 alternately. Therefore, the expanding process is easily carried out without a collision of adjacent former dies 5a, even when the expanding process is carried out on the stator core 1 having a large number of slots provided at narrower intervals therebetween.

In this embodiment, the overlapping portion 2a is formed by overlapping the ends of the sheet-shaped insulating member 2 formed into the cylindrical shape. The insulating member 2 covers and fills the inside opening 4a of the slot 4. The overlapping portion 2a is positioned to oppose to the radial outside wall in the slot 4 and is sandwiched between the conductor 3 and the inner surface of the slot 4. Therefore, it is possible to maintain the insulation certainly even under a strong vibration of the vehicular AC generator.

In this embodiment, the expanding portion 2b is formed as the funnel shape. Alternatively, a shape having steps, a shape having a flange, a shape having expanded pleats or the like can be used as an alternative to provide similar functions and effects described above.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. A method for manufacturing a stator of a rotary electric machine, the method comprising:

inserting an insulating member into a slot formed on a stator core of the stator, said insulating member providing an inner cavity for accommodating a conductor;

expanding an end of said insulating member protruding from said slot;

moving said insulating member for a predetermined distance toward a side of said expanded end; and inserting the conductor into said cavity after said moving step, the conductor being inserted axially from said expanded end.

2. A method for manufacturing a stator of a rotary electric machine, according to claim 1, wherein:

said end is expanded by using a former being heated, said former being pressed on said end.

3. A method for manufacturing a stator of a rotary electric machine, according to claim 2, wherein:

said former comprises a conical-shaped former die.

4. A method for manufacturing a stator of a rotary electric machine, according to claim 3, wherein:

said former comprises a plurality of former dies.

5. A method for manufacturing a stator of a rotary electric machine, according to claim 2, further comprising:

a plurality of slots and a plurality of insulating members therein, and wherein said former expands a plurality of ends by expanding a part of said ends, moving in a circumferential direction, and expanding another of said ends.

6. A method for manufacturing a stator of a rotary electric machine, according to claim 1, wherein:

said conductor inserting process comprises, starting an insertion of said conductor while said insulating member is axially supported, releasing a support of said insulating member, and continuing said insertion.

7. A method for manufacturing a stator of a rotary electric machine, according to claim 1, wherein:

said insulating member has an overlapping portion formed by overlapping with two ends of said insulating member, said overlapping portion being positioned on an inner wall surface of said slot.

8. A method for manufacturing a stator of a rotary electric machine, according to claim 7, wherein:

said overlapping portion is positioned in a radial outside.

9. A method for manufacturing a stator of a rotary electric machine, according to claim 1, wherein said predetermined distance in said moving step is sufficient to move a deformed portion of the insulating member deformed in the expanding step to a position outside the slot.

10. A method for manufacturing a stator of a rotary electric machine, according to claim 1, wherein inserting the conductor comprises:

starting an insertion of said conductor along an axial direction while supporting said insulating member axially against a force from said conductor;

continuing said insertion; and releasing said support of said insulating member between said starting and a completion of said insertion.

11. A method for manufacturing a stator of a rotary electric machine, the method comprising:

forming an insulating member into a cylindrical shape with an overlapping portion by rounding the member and overlapping longitudinal edges of the insulating member;

placing the insulating member into a slot formed on a stator core of the stator, the insulating member is placed so as to position the overlapping portion on an inner wall surface of the slot; and a inserting conductor into the insulating member along an axial direction from an axial end opening of the cylindrical shaped insulating member.

12. The method for manufacturing a stator of a rotary electric machine, according to claim 11, wherein the overlapping portion is positioned in a radial outside.

13. A method for manufacturing a stator of a rotary electric machine, the method comprising:

placing a plurality of insulating members into slots formed on a stator core of the stator respectively so that plurality of ends of the insulating members protrude from an axial end of the stator core;

a first step of expanding one of the protruded ends of the insulating members by pressing a former die on the protruded end;

relatively moving the former and the stator core carrying the insulating member in a circumferential direction;

a second step of expanding another one of the protruded ends of the insulating members by pressing the former die on the protruded end; and inserting a conductor into the insulating member along an axial direction from the ends expanded in the expanding steps.

14. The method for manufacturing a stator of a rotary electric machine according to claim 13, wherein the first expanding step expands at least two of the protruded ends by using a plurality of former dies arranged along the circumferential direction with a predetermined interval corresponding to an interval between the protruded ends to be expanded, and the second expanding step expands at least one of the other protruded ends by using the plurality of former dies used in the first expanding step.

15. The method for manufacturing a stator of a rotary electric machine according to claim 13, wherein the first expanding step expands a first group of the protruded ends by using a plurality of former dies arranged along the circumferential direction with a predetermined interval corresponding to an interval between the protruded ends to be expanded, and the second expanding step expands a second group of the protruded ends by using the plurality of former flies used in the first expanding step.

16. A The method for manufacturing a stator of a rotary electric machine according to claim 15, wherein the first group is composed of a plurality of the protruded ends located in alternate slots, and the second group is composed of a plurality of protruded ends located between the protruded ends of the first group.

17. The method for manufacturing a stator of a rotary electric machine according to claim 13, further comprising forming the insulating member into a cylindrical shape with an overlapping portion by rounding the insulating member and overlapping longitudinal edges of the insulating member, wherein the insulating member placing step is performed so that the overlapping portion is placed on an inner wall surface of the slot.

18. The method foil manufacturing a stator of a rotary electric machine according to claim 17, further comprising a step of moving the insulating member before the conductor inserting step, for a distance toward a side of the end expanded in the expanding step.

* * * * *